United States Patent
Yang et al.

(10) Patent No.: US 11,723,079 B2
(45) Date of Patent: Aug. 8, 2023

(54) SYSTEMS AND METHODS FOR WIRELESS MESH NETWORK DEVICES OPERATING ON MULTIPLE RADIO ACCESS TECHNOLOGIES

(71) Applicant: Verizon Patent and Licensing Inc., Basking Ridge, NJ (US)

(72) Inventors: Jin Yang, Orinda, CA (US); Lalit R. Kotecha, San Ramon, CA (US); Donna L. Polehn, Mercer Island, WA (US); Vishwanath Ramamurthi, San Ramon, CA (US); Maria G. Lam, Oakland, CA (US); Arda Aksu, Lafayette, CA (US); Suzann Hua, Beverly Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 221 days.

(21) Appl. No.: 17/322,197

(22) Filed: May 17, 2021

(65) Prior Publication Data

US 2022/0369383 A1    Nov. 17, 2022

(51) Int. Cl.
*H04W 74/08* (2009.01)
*H04W 72/0446* (2023.01)
*H04W 72/1273* (2023.01)
*H04W 74/00* (2009.01)

(52) U.S. Cl.
CPC ... *H04W 74/0841* (2013.01); *H04W 72/0446* (2013.01); *H04W 72/1273* (2013.01); *H04W 74/008* (2013.01)

(58) Field of Classification Search
CPC ......... H04W 74/0841; H04W 72/0446; H04W 72/1273; H04W 74/008
See application file for complete search history.

(56) References Cited

U.S. PATENT DOCUMENTS

| | | | |
|---|---|---|---|
| 9,826,451 B2 * | 11/2017 | Jung | H04W 36/14 |
| 11,129,142 B1 * | 9/2021 | Shukla | H04W 72/0446 |
| 2011/0243047 A1 * | 10/2011 | Dayal | H04W 16/14 370/329 |
| 2012/0129540 A1 * | 5/2012 | Hakola | H04W 72/23 455/450 |
| 2013/0188552 A1 * | 7/2013 | Kazmi | H04W 88/04 370/315 |
| 2015/0288566 A1 * | 10/2015 | Sadek | H04B 17/318 370/254 |
| 2017/0086251 A1 * | 3/2017 | Valliappan | H04L 43/16 |
| 2017/0111284 A1 * | 4/2017 | Speight | H04W 40/12 |
| 2018/0213379 A1 * | 7/2018 | Xiong | H04W 4/70 |

\* cited by examiner

*Primary Examiner* — Ivan O Latorre

(57) ABSTRACT

Embodiments described herein provide for a hybrid network device to serve as a zero- or low-latency relay for communications between a wireless network, such as a licensed wireless network, and one or more other devices. The hybrid network device may establish a connection with a base station of a wireless network via a licensed radio access technology ("RAT"). The hybrid network device may communicate with one or more devices via an unlicensed RAT. The hybrid network device of some embodiments may aggregate communications from devices and may serve as a single connection endpoint with respect to the base station, such that the base station need not maintain a relatively large number of connections to accommodate a relatively large quantity devices.

20 Claims, 11 Drawing Sheets

SYSTEMS AND METHODS FOR WIRELESS MESH NETWORK DEVICES OPERATING ON MULTIPLE RADIO ACCESS TECHNOLOGIES

BACKGROUND

Internet of Things ("IoT") devices and other types of devices may be deployed in order to collect and report sensor measurements, provide alerts, and/or perform other functions. IoT devices may communicate over a wireless network, such as a WiFi network, a Long-Term Evolution ("LTE") network, or some other type of network, with an application server or some other remote device in order to provide sensor measurements, receive configuration information, and/or to send and/or receive other types of communications.

DETAILED DESCRIPTION OF EXAMPLE EMBODIMENTS

Figure 1:
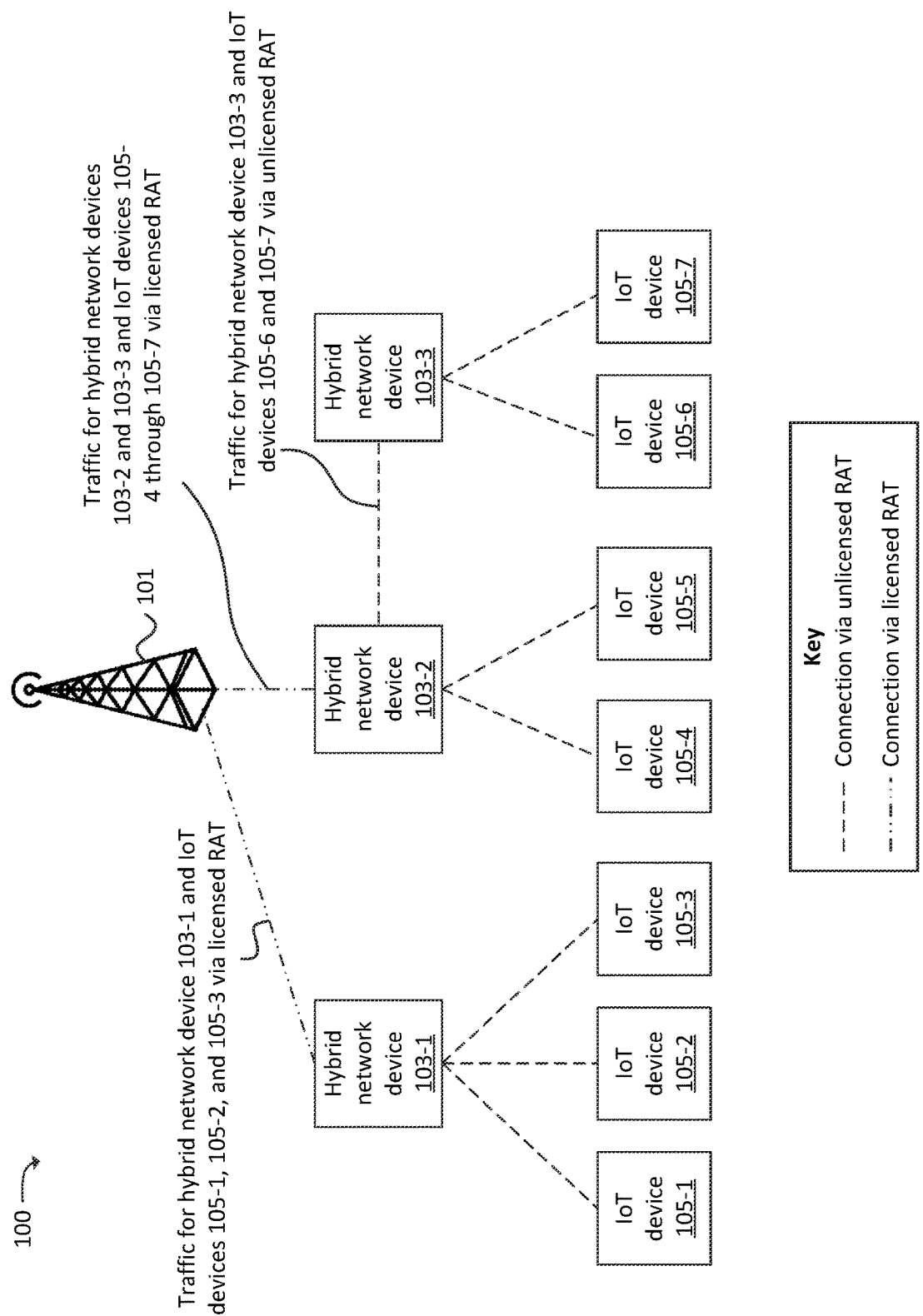
FIG. 1 illustrates an example overview of one or more embodiments described herein.

The following detailed description refers to the accompanying drawings. The same reference numbers in different drawings may identify the same or similar elements.

Embodiments described herein provide for a hybrid network device to serve as a zero- or low-latency relay for communications between a wireless network, such as a licensed wireless network, and one or more other devices, such as IoT devices, User Equipment ("UEs"), and/or other types of devices. For example, the hybrid network device may establish a connection with a base station of a wireless network via one or more licensed radio access technologies ("RATs"), such as a LTE RAT, a Fifth Generation ("5G") RAT, or some other licensed RAT. As referred to herein, a "licensed" RAT may be a RAT for which the use is restricted to certain entities (e.g., wireless network operators) that have received a license from an authoritative entity, such as a governmental agency or other authority. The hybrid network device may communicate with one or more IoT devices or other types of devices via one or more unlicensed RATs, such as a WiFi RAT, a Bluetooth® RAT, or some other unlicensed RAT. As referred to herein, an "unlicensed" RAT may be a RAT for which the use is unrestricted for use and/or for which a license need not be obtained from an authoritative entity. The hybrid network device of some embodiments may aggregate communications from multiple IoT devices and may serve as a single connection endpoint with respect to the base station, such that the base station need not maintain a relatively large number of connections to accommodate a relatively large quantity of IoT devices.

Further, the hybrid node of some embodiments may obtain radio frequency ("RF") resources from the base station, where such RF resources include a temporal element (e.g., time slots), and may provide timing information to the IoT devices based on the granted RF resources. For example, the hybrid node may receive information regarding one or more downlink and/or uplink channels, such as Physical Resource Blocks ("PRBs") on which the hybrid node may send and/or receive information from the base station. A PRB may include a frequency or range of frequencies, as well as timing information, that have been granted by the base station for the hybrid network device to send and/or receive traffic from the base station. The hybrid network device may provide selected timing information to respective IoT devices, and the IoT devices may communicate with the hybrid device based on the timing information. For example, a given IoT device may provide up-to-date sensor readings (e.g., temperature sensor information, photosensor information, autonomous vehicle sensor information such as video data, Light Detection and Ranging ("LIDAR") data, accelerometer data, and/or other types of sensor information) and/or other information to a network by communicating with the hybrid network device at intervals based on the timing information.

Since these intervals are based on the RF resources (e.g., including the temporal element) granted by the base station, the hybrid network device may serve as a zero-latency (or near zero-latency) communications relay between the IoT devices and the base station. For example, the hybrid network device may not need to delay (e.g., due to caching, buffering, or other time delay operations) the communications from the IoT devices when providing such communications to the base station, as the times at which the hybrid network device receives such communications from the IoT devices may be synchronized and/or otherwise match the RF resources granted by the base station. Thus, the IoT devices may receive low-latency network services, similar to a direct connection with the base station, without the need for establishing a dedicated connection with the base station, thereby reducing network and/or processing load associated with the base station.

Further, hybrid network devices may themselves be or include IoT devices. For example, a given hybrid network device may include one or more sensors or other input devices, output devices (e.g., speakers, display screens, etc.). Additionally, hybrid network devices may serve as relays for other hybrid network devices, such as in instances where a first hybrid network device is within communications range of a base station and a second hybrid network device, but the second hybrid network device is not within communications range of the base station.

As shown in FIG. 1, system 100 may include base station 101, hybrid network devices 103 (e.g., hybrid network devices 103-1, 103-2, and 103-3 in this example), and IoT devices 105 (e.g., IoT devices 105-1 through 105-7, in this example). Hybrid network devices 103 may include wireless circuitry (e.g., radios, antennas, transceivers, etc.) that is capable of communicating via one or more licensed RATs and one or more unlicensed RATs. For example, base station 101 may be a base station of a radio access network ("RAN") that operates on one or more licensed RATs, such as an LTE RAT, a 5G RAT, and/or some other licensed RAT, and hybrid network devices 103 may connect to and/or communicate with base station 101 via the one or more licensed RATs.

In this example, hybrid network devices 103-1 and 103-2 may communicate with base station 101 via one or more licensed RATs. After connecting to base station 101, hybrid network device 103 (e.g., hybrid network device 103-1 and/or 103-2) may output (e.g., on a periodic or intermittent basis) a broadcast message, beacon, and/or some other type of signal indicating a presence of hybrid network device 103 and/or an indication that hybrid network device 103 has connected to base station 101. For example, hybrid network device 103 may wirelessly output a Service Set Identifier ("SSID") or other type of signal, which may include a code, identifier, and/or other indicator that hybrid network device 103 has connected to base station 101 via a licensed RAT.

Further in this example, hybrid network device 103-3 may not communicate directly with base station 101 via the one or more licensed RATs. For instance, hybrid network devices 103-1 and 103-2 may be within communications range of base station 101, and hybrid network device 103-3 may be outside of communications range of base station 101. Additionally, or alternatively, hybrid network device 103-3 may be within communications range of base station 101, but signal quality and/or other connection metrics may be below a threshold level. Additionally, or alternatively, signal quality and/or connection metrics between hybrid network device 103-3 and hybrid network device 103-2 may exceed signal quality and/or connection metrics between hybrid network device 103-3 and base station 101, and hybrid network device 103-3 may have connected to hybrid network device 103-2 based on determining that higher signal quality and/or connection metrics may be obtained via hybrid network device 103-2 than base station 101. In some embodiments, hybrid network devices 103-2 and 103-3 may communicate via an unlicensed RAT, such as WiFi, Bluetooth®, and/or some other suitable unlicensed RAT.

In some embodiments, hybrid network devices 103 may "prefer" a connection with another hybrid network device 103 over a connection with base station 101. For example, hybrid network device 103-3 may connect to hybrid network device 103-2 based on detecting that hybrid network device 103-2 is within communications range of hybrid network device 103-3, and/or that hybrid network device 103-2 has a connection with base station 101. Thus, in instances where connections to base station 101 (e.g., via a licensed RAT) and hybrid network device 103-2 are available, hybrid network device 103-3 may select the connection to hybrid network device 103-2 via the unlicensed RAT. In some embodiments, hybrid network device 103-3 may more heavily weight hybrid network device 103-2 over base station 101 in a scoring or other determination of whether to connect to base station 101 or hybrid network device 103-2.

IoT devices 105 may each communicate wirelessly with a particular hybrid network device 103. In the example shown in FIG. 1, IoT devices 105-1, 105-2, and 105-3 may be wirelessly connected (e.g., via an unlicensed RAT) to hybrid network device 103-1, IoT devices 105-4 and 105-5 may be wirelessly connected to hybrid network device 103-2, and IoT devices 105-6 and 105-7 may be wirelessly connected to hybrid network device 103-3. In some embodiments IoT devices 105 may be devices that include wireless communication circuitry that is able to communicate via unlicensed RATs. In some embodiments, IoT devices 105 may be devices that include wireless communication circuitry that is not able to and/or is not configured to communicate via licensed RATs, and/or may be devices that do not include wireless communication circuitry that is able to communicate via licensed RATs.

IoT devices 105 may include and/or may be communicatively coupled to input devices (e.g., mice, keyboards, or the like), sensors (e.g., accelerometers, LIDAR sensors, photosensors, cameras, barometers, air particulate matter sensors, gyroscopes, thermometers, and/or other types of sensors), and/or other types of devices or components. While examples provided herein are discussed in the specific context of IoT devices, in practice, similar concepts may be applied to other types of devices that wirelessly communicate over one or more networks (e.g., unlicensed networks), such as mobile phones, tablet devices, laptops, and/or other suitable devices. Further, hybrid network devices 103 may be "hybrid" devices in that hybrid network devices 103 may serve as communication relays between IoT devices 105 and base station 101, and may further include one or more IoT devices 105 and/or additionally perform functionality similar to or identical to one or more IoT devices 105 (e.g., as discussed herein).

As mentioned above, IoT devices 105 may output (e.g., on an ongoing basis, a periodic basis, an intermittent basis, and event-based basis, and/or on some other basis) information to an application server, a Multi-Access/Mobile Edge Computing ("MEC") device, referred to sometimes herein simply as a "MEC," and/or some other device or system via a network. For example, base station 101 may provide uplink traffic from IoT devices 105 to a core network, which may route the traffic to an application server via the Internet or some other network.

In some embodiments, base station 101 may provide uplink traffic from IoT devices to a MEC that is co-located with, or in close proximity (e.g., within a threshold proximity) to, base station 101 and/or is otherwise communicatively coupled to base station 101, without providing the uplink traffic to the core network. Communicating with the MEC without communicating with the core network may result in lower latency communications between IoT device 105 (and/or hybrid network device 103) and the MEC, thus resulting in lower latency of services provided by the MEC. For example, the MEC may perform processing on information provided by IoT devices 105 and/or hybrid network devices 103, and may provide feedback, configuration information, alerts, and/or other information to IoT devices 105 and/or hybrid network devices 103 generated based on processing the provided information.

Hybrid network devices 103 may each establish one or more connections with base station 101, such as by performing an "attach" procedure or other suitable procedure, which may include communicating one or more Radio Resource Control ("RRC") messages with base station 101 to establish the connection(s). A given hybrid network device 103 may further determine an amount and/or timing of RF resources to request from base station 101, such as a quantity of PRBs and/or a timing offset and/or periodicity of PRBs to request. For example, hybrid network device 103 may determine the quantity and/or timing of PRBs to request based on a quantity of IoT devices 105 connected to hybrid network device 103, types of IoT devices 105 connected to hybrid network device 103 (e.g., where different makes, models, and/or other attributes of IoT devices 105 may be different "types"), requests from IoT devices 105 (e.g., where IoT devices 105 may request particular timing intervals and/or amounts of traffic to send, may request particular Quality of Service ("QoS") metrics such as latency metrics, etc.), and/or based on other factors. Base station 101 may indicate (e.g., via RRC messaging or other suitable messaging) an amount and/or timing of granted PRBs (e.g., PRBs allocated, allotted, etc. by base station 101 for use by hybrid network device 103) to hybrid network device 103.

Hybrid network device 103 may notify IoT devices 105 (e.g., via an application programming interface ("API") or other suitable communication pathway) of timing and/or throughput information of resources granted on behalf of each IoT device 105. For example, hybrid network device 103-1 may receive a grant of a particular set of PRBs (e.g., a periodically repeating set of PRBs) from base station 101. Hybrid network device 103-1 may notify IoT device 105-1 that IoT device 105-1 has been allocated a first amount of traffic (e.g., throughput) on a first timing interval (e.g., based on a first portion of the granted set of PRBs), may notify IoT device 105-2 that IoT device 105-2 has been allocated a second set of traffic on a second timing interval (e.g., based on a second portion of the granted set of PRBs), and may notify IoT device 105-3 that IoT device 105-3 has been allocated a third set of traffic on a third timing interval (e.g., based on a third portion of the granted set of PRBs). In this example, the first, second, and third portions of the granted set of PRBs may cumulatively be equal to or less than the granted set of PRBs. In some embodiments, the granted set of PRBs may be "over-provisioned," such that the first, second, and third portions of the granted set of PRBs may cumulatively be greater than the granted set of PRBs. In such situations, hybrid network device 103 may perform load balancing, filtering, or other techniques to output traffic to base station 101 utilizing the granted set of PRBs (e.g., without exceeding the granted set of PRBs).

Hybrid network device 103 may perform similar techniques for hybrid network devices 103 that are connected to hybrid network device 103 via a licensed RAT. For example, hybrid network device 103-3 may forward, to hybrid network device 103-2, information indicating requested resources for IoT devices 105-6 and 105-7 (e.g., IoT devices 105 that are communicatively coupled to hybrid network device 103-3) based on identifying timing and/or throughput information associated with IoT devices 105-6 and 105-7, in a manner similarly discussed above. Hybrid network device 103-2 may also identify resources to request, from base station 101, on behalf of IoT devices 105-4 and 105-5. Thus, hybrid network device 103-2 may request PRBs, from base station 101, based on resources requested by or otherwise associated with IoT devices 105-4 through 105-7 (and hybrid network device 103-3, in situations where hybrid network device 103-3 itself requests resources in order to output uplink traffic to base station 101). Hybrid network device 103-3 may, in this example, serve as a communication relay between IoT devices 105-6 and 105-7, and hybrid network device 103-2. Further, hybrid network device 103-2 may serve as a communication relay between hybrid network device 103-3 and base station 101. In this manner, uplink traffic from IoT devices 105-6 and 105-7 may be carried by hybrid network devices 103-2 and 103-3 to base station 101. For example, hybrid network device 103-3 may provide traffic, received from IoT devices 105-6 and 105-7, to hybrid network device 103-2 via an unlicensed RAT, and hybrid network device 103-2 may further provide such traffic to base station 101 via a licensed RAT. In this manner, IoT devices 105 may have logical connections or pseudo-connections with base station 101, without the need for base station 101 to establish or maintain physical connections with IoT devices 105. Further, as IoT devices 105 are made aware of timing information based on which traffic is sent (e.g., relayed) to base station 101, IoT devices 105 are able to provide up-to-date (e.g., accurate to the millisecond or some other relatively high measure of accuracy and precision) information to a MEC, application server, or other suitable device or system.

Figure 2:
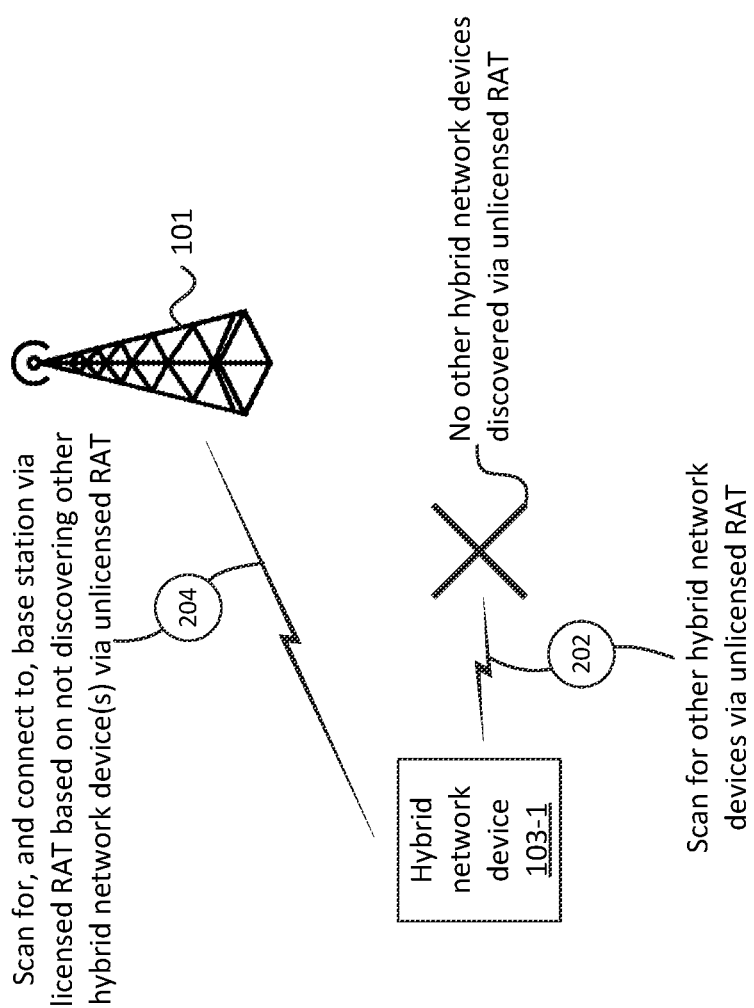
FIGS. 2 and 3 illustrate example communications in accordance with some embodiments, in which hybrid network devices may perform a discovery process to connect to other hybrid network devices and/or a base station.
Figure 3:
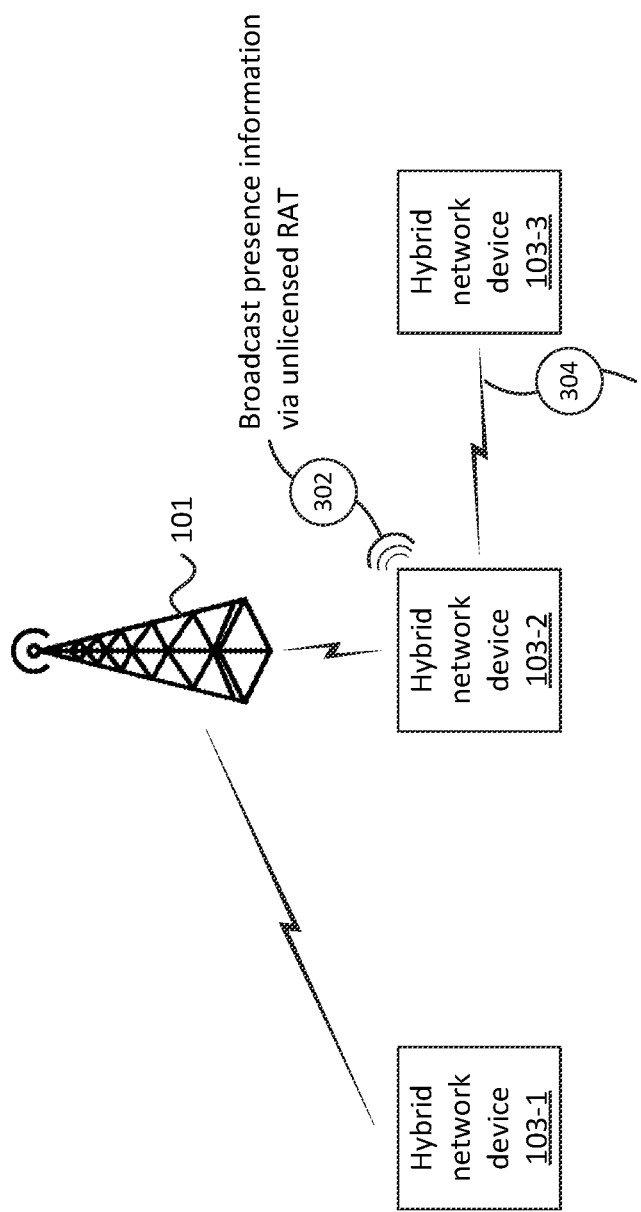

FIGS. 2 and 3 illustrate example communications in accordance with some embodiments, in which hybrid network devices 103 may perform a discovery process to connect to other hybrid network devices 103 and/or base station 101. As shown in FIG. 2, for example, hybrid network device 103-1 may scan (at 202) for other hybrid devices via an unlicensed RAT. For example, hybrid network device 103-1 may perform a WiFi scan or some other suitable type of scan to identify presence information, such as broadcasts, beacons, etc. that may be output by other hybrid network devices 103 that are within communications range of hybrid network device 103-1. For example, hybrid network device 103-1 may scan for a particular SSID, a particular SSID conforming to a particular pattern (e.g., an SSID with a fixed component and a variable component, such as "HYBRID_123" or "HYBRID_456", an SSID that includes a hashed value that matches a predetermined value or pattern, etc.), or the like. In this example, hybrid network device 103-1 may not have discovered any other hybrid network devices 103 based on the scan (at 202).

Based on not discovering other hybrid network devices 103, hybrid network device 103-1 may scan (at 204) for, and connect to, base station 101. For example, as discussed above, hybrid network device 103-1 may connect (at 204) to base station 101 based on not discovering any other hybrid network devices 103 within communications range of hybrid network device 103.

Additionally, or alternatively, hybrid network device 103 may have discovered another hybrid network device 103, but may nevertheless connect to base station 101 instead of the discovered hybrid network device 103 based on one or more factors such as connection quality (e.g., Signal-to-Interference-and-Noise-Ratio ("SINR") metrics, Channel Quality Indicator ("CQI") metrics, Received Signal Strength Indicator ("RSSI") metrics, and/or other suitable quality metrics), performance and/or QoS metrics (e.g., latency, throughput, jitter, and/or other suitable performance metrics), or other factors. For example, hybrid network device 103 may generate one or more scores based on connection quality, performance metrics, and/or one or more other factors for base station 101 and one or more other hybrid network devices 103, and may select base station 101 (or a particular hybrid network device 103, in some instances) based on the one or more scores.

FIG. 3 illustrates an example of a particular hybrid network device 103 discovering and connecting to another hybrid network device 103. As shown, for example, assume that hybrid network device 103-2 has connected to base station 101 (e.g., in a similar manner described above for hybrid network device 103-1, with respect to FIG. 2). Based on connecting to base station 101, hybrid network device 103-2 may wirelessly output (at 302) presence information via an unlicensed RAT. For example, hybrid network device 103-2 may broadcast an SSID and/or output some other type of beacon, signal, etc. In some embodiments, information output (at 302) by hybrid network device 103-2 may be different when hybrid network device 103-2 is connected to base station 101 than when hybrid network device 103-2 is not connected to base station 101. For example, when hybrid network device 103-2 is not connected to base station 101, hybrid network device 103-2 may broadcast an SSID such as "HYBRID_NO_RAN", and when hybrid network device 103-2 is connected to base station 101, hybrid network device 103-2 may broadcast an SSID such as "HYBRID_123" or some other SSID that indicates a connection to base station 101. In some embodiments, the SSID may include or may be based on a cell identifier or other identifier associated with base station 101.

Hybrid network device 103-3 may scan (at 304) for, and connect to, hybrid network device 103-2 via the unlicensed RAT. For example, hybrid network device 103-3 may be powered on, may enter a communications range associated with hybrid network device 103-2, and/or may otherwise initiate the scan for another hybrid network device 103. As noted above, hybrid network device 103-3 may connect (at 304) to hybrid network device 103-2 based on determining that hybrid network device 103-2 is within communications range of hybrid network device 103-3, and further based on determining that hybrid network device 103-2 is connected to base station 101 (e.g., based on the SSID or other suitable information). In some embodiments, hybrid network device 103-3 may determine to connect to hybrid network device 103-2 based on one or more other factors, such as a higher connection quality score and/or performance score associated with hybrid network device 103-2 than base station 101. Additionally, or alternatively, hybrid network device 103-3 may not be within communications range of base station 101, and may connect to hybrid network device 103-2 based on no detected base stations 101.

Figure 4:
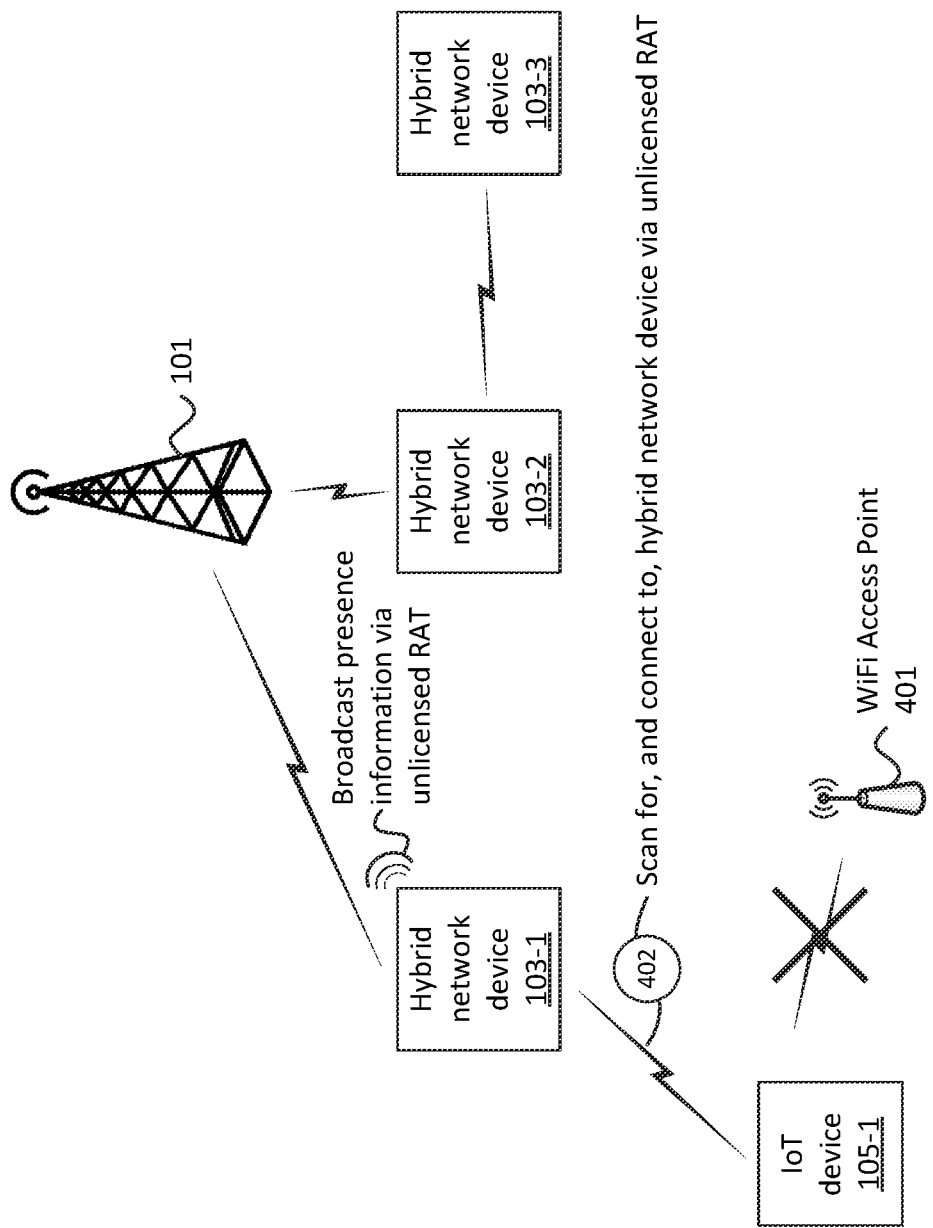
FIG. 4 illustrates an example of the discovery of a hybrid network device by an IoT device, in accordance with some embodiments.

FIG. 4 illustrates an example of the discovery of hybrid network device 103 by IoT device 105. For example, as shown, IoT device 105-1 may scan (at 402) for, and connect to, hybrid network device 103-1. For example, IoT device 105-1 may perform a WiFi scan or other suitable type of scan via an unlicensed RAT, to identify a presence of hybrid network device 103-1. For example, as similarly discussed above with respect to FIG. 3, hybrid network device 103-1 may broadcast presence information such as an SSID and/or other suitable information, indicating the availability of hybrid network device 103-1 for connection and/or the connection of hybrid network device 103-1 to base station 101. In some embodiments, IoT device 105-1 may "prefer" to connect to hybrid network device 103-1 over another type of network, such as WiFi access point 401. For example, IoT device 105-1 may be within communications range of hybrid network device 103-1 and WiFi access point 401, and may detect presence information from hybrid network device 103-1 and WiFi access point 401. In such a situation, IoT device 105-1 may connect to hybrid network device 103-1 in lieu of WiFi access point 401. For example, IoT device 105-1 may identify hybrid network device 103-1 based on an SSID output by hybrid network device 103-1 matching a preconfigured pattern, including encoded information based on in which IoT device 105-1 may identify that hybrid network device 103-1 is a hybrid network device as opposed to some other sort of device or access point, and/or otherwise indicating that IoT device 105-1 should "prefer" a connection to hybrid network device 103-1.

Figure 5A:
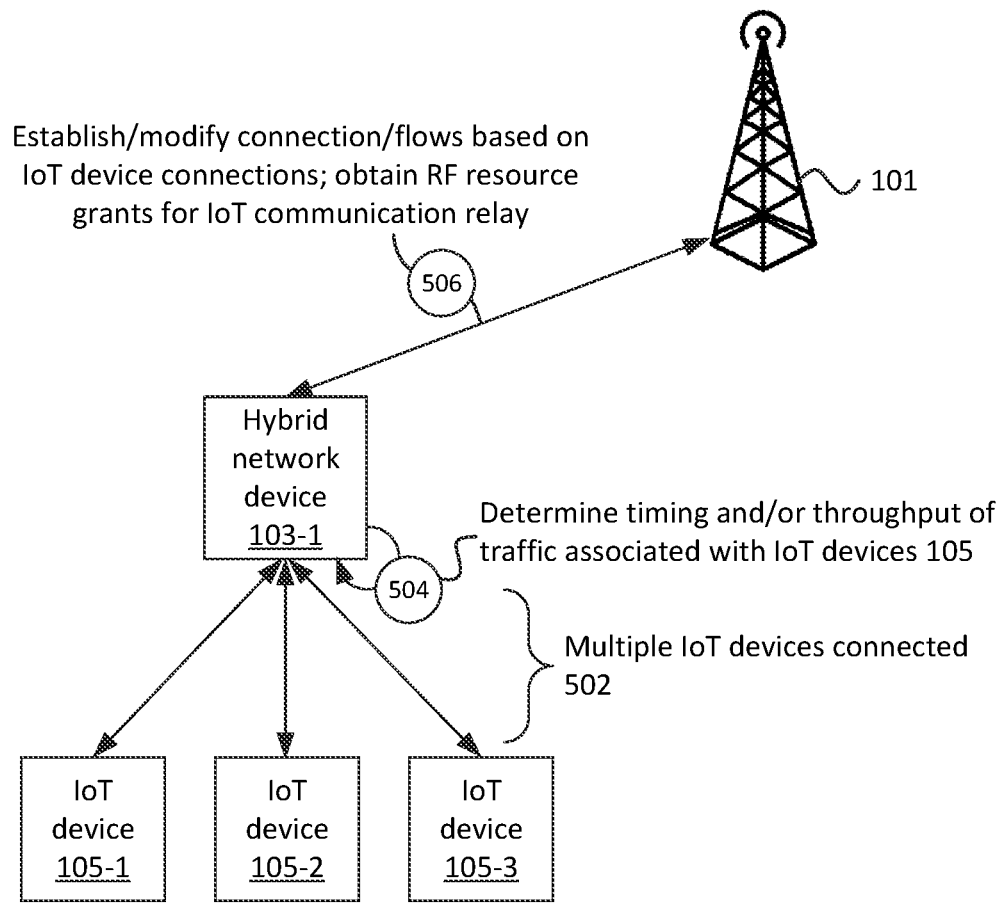
FIGS. 5A-5C illustrate examples of low-latency communications between IoT devices and a base station via a hybrid network device, in accordance with some embodiments.
Figure 5B:
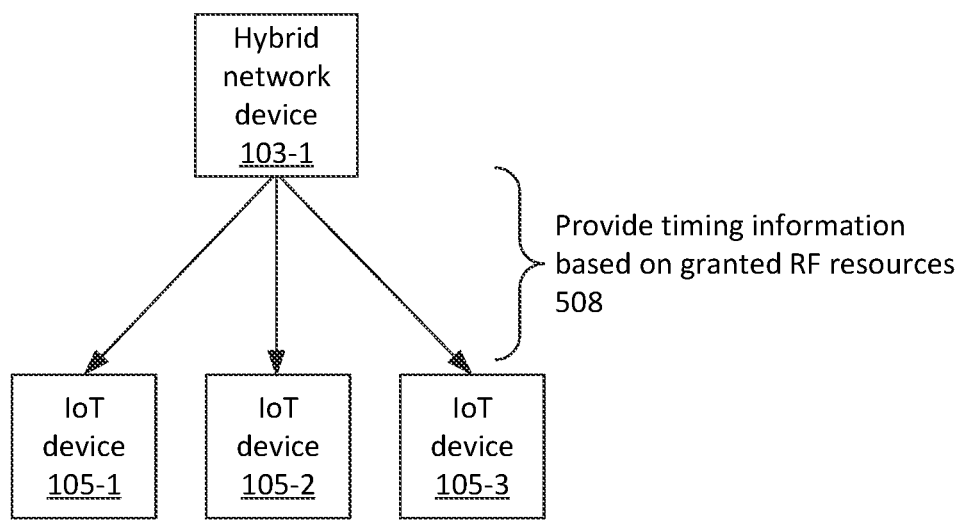
Figure 5C:
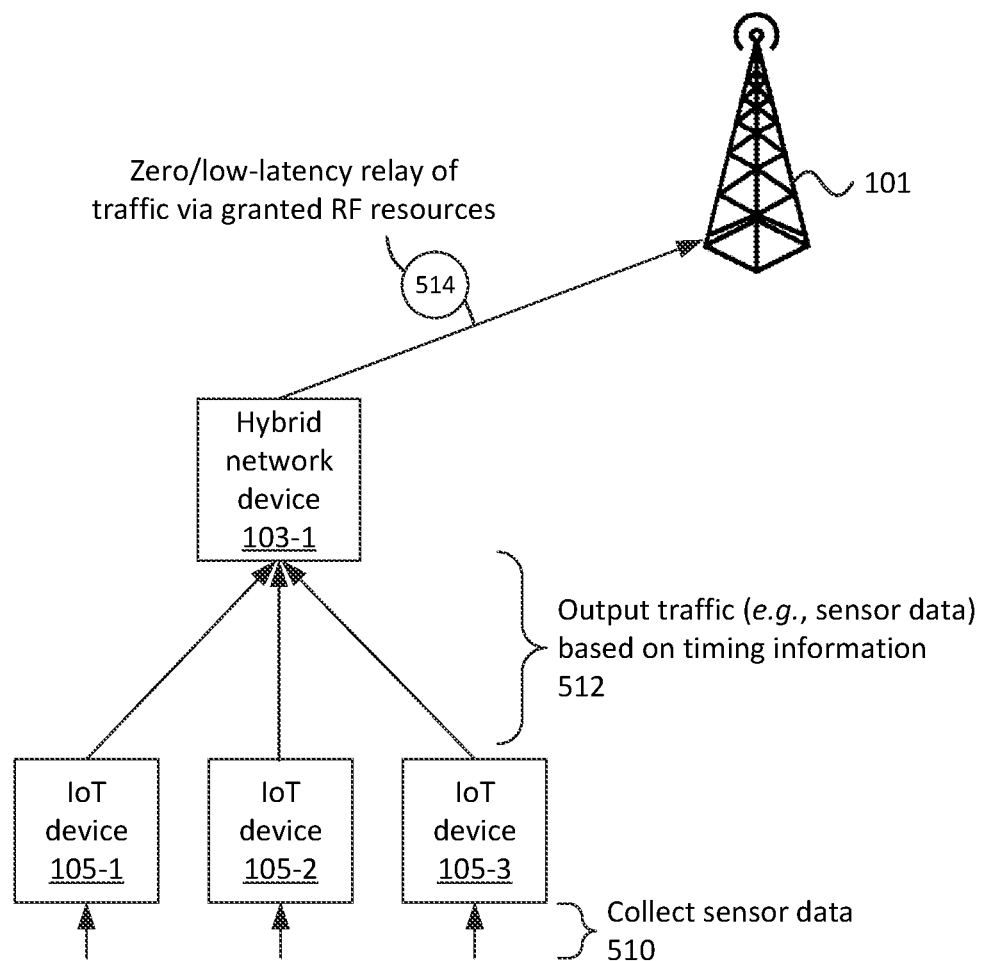

FIGS. 5A-5C illustrate examples of low-latency communications between IoT devices 105 and base station 101 via hybrid network device 103, in accordance with some embodiments. As shown in FIG. 5A, multiple IoT devices 105 may be connected (at 502) to hybrid network device 103-1. For example, IoT devices 105-1 through 105-3 may have connected to hybrid network device 103-1 in a similar manner as discussed above with respect to FIG. 4. Hybrid network device 103-1 may determine (at 504) timing and/or throughput of traffic associated with IoT devices 105. For example, when connecting to hybrid network device 103-1, IoT devices 105 may indicate (e.g., via an API or other suitable communication pathway) a requested interval or other timing information at which IoT devices 105 output traffic, an amount of traffic that IoT devices 105 output (e.g., an amount of traffic over time, an amount of traffic per "burst" or per timing interval, etc.), a maximum latency, and/or other information describing attributes of traffic output by IoT devices 105. In some embodiments, hybrid network device 103-1 may request (e.g., "pull") such information from IoT devices 105 when IoT devices 105 connect to hybrid network device 103-1. In some embodiments, hybrid network device 103-1 may determine such information without communicating with IoT devices 105 regarding such information. For example, hybrid network device 103-1 may identify a device type or identity associated with IoT devices 105 (e.g., based on a Media Access Control ("MAC") address or other identifier of IoT devices 105), and may determine the timing and/or throughput information based on the device type or identity. In some embodiments, hybrid network device 103-1 may determine the timing and/or throughput information associated with each IoT device 105 in some other suitable manner.

Hybrid network device 103-1 may establish and/or modify (at 506) a connection with base station 101 based on the timing and/or throughput information associated with connected IoT devices 105-1 through 105-3. For example, hybrid network device 103-1 may request an amount and/or timing of PRBs based on the timing and/or throughput information associated with connected IoT devices 105-1 through 105-3. As noted above, the requested PRBs may be about equal to the amount of PRBs necessary to satisfy the timing and/or throughput information associated with connected IoT devices 105-1 through 105-3. In some embodiments, the requested PRBs may be lower than the amount of PRBs necessary to satisfy the timing and/or throughput information associated with connected IoT devices 105-1 through 105-3 (e.g., the PRBs may be "over-provisioned"). In some embodiments, the requested PRBs may be higher (e.g., by a particular factor or threshold amount) than the amount of PRBs necessary to satisfy the timing and/or throughput information associated with connected IoT devices 105-1 through 105-3, in order to provide headroom in instances where the actual traffic output by IoT devices 105 exceeds the amount determined (at 504) by hybrid network device 103-1. In some embodiments, base station 101 may grant the requested resources (e.g., PRBs), and may indicate particular PRBs that have been granted or allocated for use by hybrid network device 103-1.

As shown in FIG. 5B, hybrid network device 103-1 may provide (at 508) timing information to each IoT device 105 based on the granted RF resources (e.g., PRBs). For example, hybrid network device 103-1 may indicate a periodic interval or other indication of timing associated with each respective IoT device 105. In some embodiments, hybrid network device 103-1 may indicate a maximum amount or rate of traffic (e.g., in terms of bytes, kilobytes, megabytes, etc. per second, per timing interval, or other unit of time) that may be accommodated from each respective IoT device 105. As noted above, the timing information for each IoT device 105 may be different, and may be based on the determined (at 504) timing and/or throughput associated with each IoT device 105.

As shown in FIG. 5C, each IoT device 105 may collect (at 510) sensor data and/or may otherwise determine data to be output by each respective IoT device 105. IoT devices 105 may each output (at 512) traffic, such as the collected sensor data, to hybrid network device 103-1 based on the timing information. For example, a given IoT device 105 may output sensor data collected during a current timing interval to hybrid network device 103-1, such that over time, IoT device 105 periodically (or on some other basis) outputs up-to-date sensor data on an ongoing basis in real time or near-real time. Hybrid network device 103-1 may output (at 514) the received traffic to base station 101, which may forward the traffic to a MEC that is communicatively coupled to base station 101, a core network, and/or some other suitable destination. In this manner, hybrid network device 103-1 may serve as a zero-latency or low-latency relay of traffic from IoT devices 105.

In some embodiments, when outputting the traffic to base station 101, hybrid network device 103-1 may add header information or other suitable information indicating a particular IoT device 105 from which the traffic was received. In this manner, a recipient of the traffic (e.g., a MEC, an application server, or other suitable device or system) may be able to uniquely identify a particular IoT device 105 from which the sensor data was received. Further, the recipient of the traffic may be able to use such information when sending the traffic to IoT devices 105. For example, hybrid network device 103-1 may receive (e.g., from base station 101) traffic for multiple IoT devices 105, may identify particular traffic destined for a particular IoT device 105, and may route the traffic to the appropriate IoT device 105.

Figure 6:
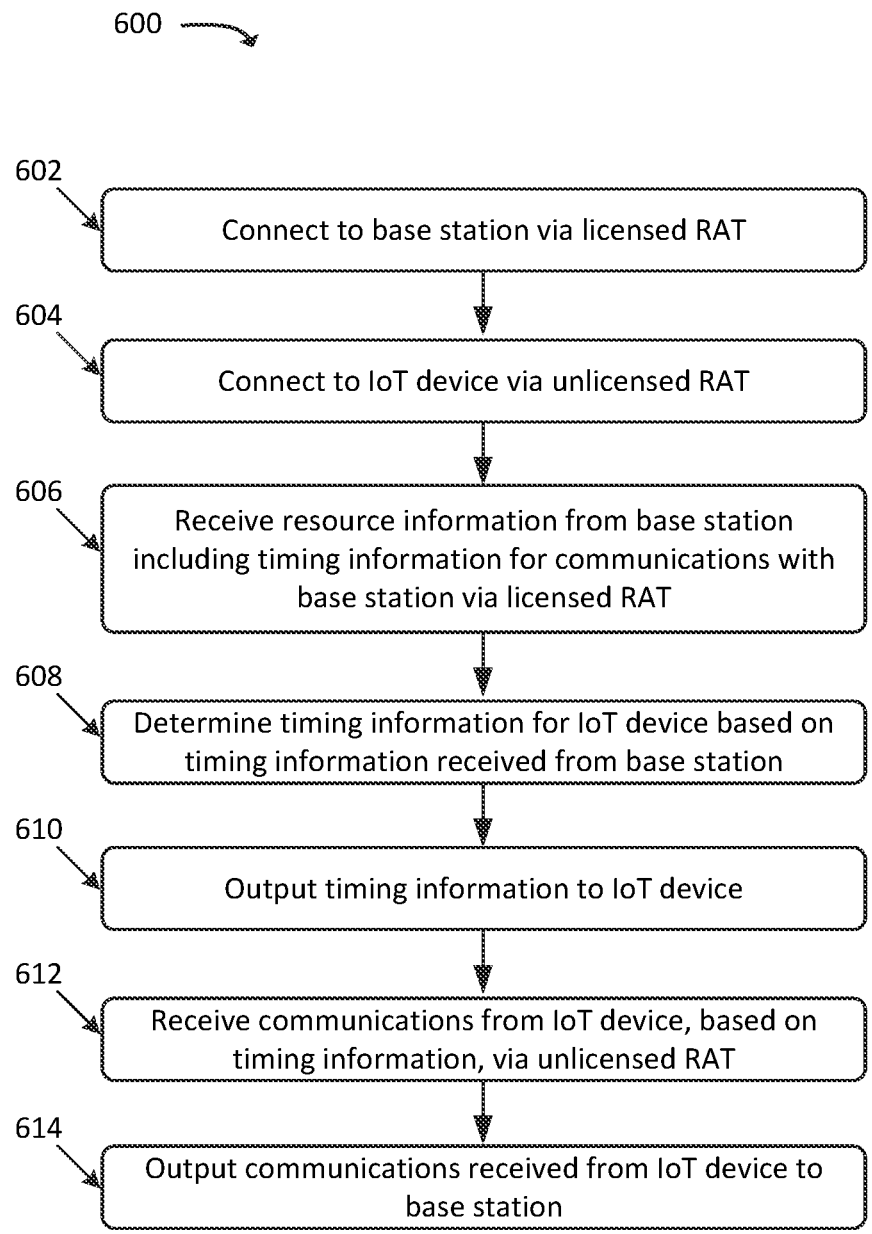
FIG. 6 illustrates an example process for establishing and relaying low-latency communications between IoT devices and a base station via a hybrid network device, in accordance with some embodiments.

FIG. 6 illustrates an example process 600 for establishing and relaying low-latency communications between IoT devices 105 and base station 101 via hybrid network device 103, in accordance with some embodiments. In some embodiments, some or all of process 600 may be performed by hybrid network device 103. In some embodiments, one or more other devices may perform some or all of process 600 (e.g., in concert with, and/or in lieu of, hybrid network device 103).

As shown, process 600 may include connecting (at 602) to base station 101 via a licensed RAT. For example, as discussed above, hybrid network device 103 may connect to base station 101 via a 5G RAT, an LTE RAT, and/or some other licensed RAT. In some embodiments, hybrid network device 103 may first scan for another hybrid network device 103 and, if no other hybrid network device 103 is detected, hybrid network device 103 may then connect to base station 101. In some embodiments, hybrid network device 103 may select between connecting to base station 101 or another hybrid network device 103 in situations where both are available based on connection quality and/or other suitable factors. Once connected to base station 101, hybrid network device 103 may wirelessly output presence information (e.g., an SSID broadcast or other suitable type of presence information) based on connecting to base station 101. In some embodiments, the presence information may be different (e.g., a different SSID) prior to connecting to base station 101, and after connecting to base station 101.

Process 600 may further include connecting (at 604) to one or more IoT devices 105 via an unlicensed RAT. For example, one or more IoT devices 105 may detect hybrid network device 103 (e.g., based on the presence information output by hybrid network device 103), and base station 101 may connect to the one or more IoT devices 105 based on connection requests from IoT devices 105. In some embodiments, hybrid network device 103 may determine timing information for communications from IoT devices 105, such as an interval at which each IoT device 105 is configured to output communications, an amount of traffic to be sent over time and/or at each interval, or the like. For example, each IoT device 105 may output such information to hybrid network device 103, and/or hybrid network device 103 may determine the timing information in some other manner (e.g., based on a device type of IoT devices 105 and/or other factors).

Process 600 may additionally include receiving (at 606) resource information from base station 101, including timing information, for communications with base station 101 via the licensed RAT. For example, hybrid network device 103 may receive information regarding one or more PRBs that have been allocated for hybrid network device 103 by base station 101. In some embodiments, hybrid network device 103 may request a particular amount and/or interval of PRBs based on the intervals and/or amounts of traffic that IoT devices 105 are configured to output.

Process 600 may also include determining (at 608) timing information for the one or more IoT devices 105 based on the timing information received from base station 101. For example, hybrid network device 103 may determine particular timing intervals, offsets, or the like at which traffic from each IoT device 105 may be accommodated, based on the timing information received from base station 101. In some embodiments, the timing information for each IoT device 105 may be a subset of the timing information received from base station 101.

Process 600 may further include outputting (at 610) the determined timing information to the one or more IoT devices 105. For example, hybrid network device 103 may communication with each connected IoT device 105 via the licensed RAT to indicate the determined intervals, offsets, etc. for each IoT device 105.

Process 600 may additionally include receiving (at 612) communications from the one or more IoT devices 105, based on the determined timing information, via the unlicensed RAT. For example, each IoT device 105 may output traffic, which may include sensor readings and/or other types of information, at intervals indicated (at 610) by hybrid network device 103. Process 600 may also include outputting (at 614) communications received from the one or more IoT devices 105 to base station 101. For example, hybrid network device 103 may act as a zero-latency or low-latency relay between IoT devices 105 and base station 101, to enable real-time or near real-time transfer of traffic from IoT devices 105 to base station 101 via the licensed RAT.

Figure 7:
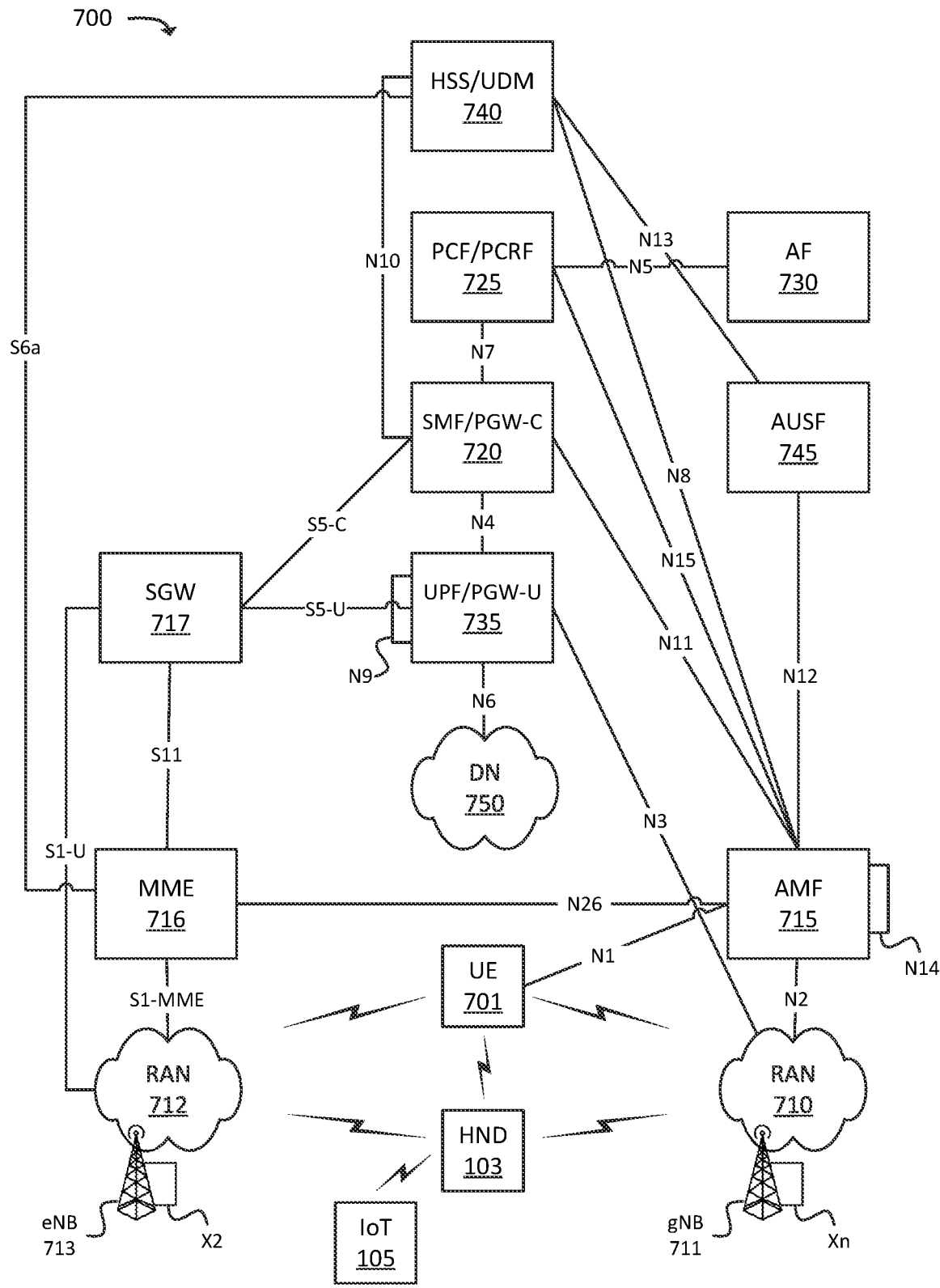
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include hybrid network device 103, IoT device 105, UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as an application server and/or some other type of device or system.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 701 may send traffic to and/or receive traffic (e.g., user plane traffic) from DN 750 via RAN 710, RAN 712, and/or UPF/PGW-U 735. In some embodiments, UE 701 may include, may implement, and/or may be communicatively coupled to hybrid network device 103. In some embodiments, UE 701 may include, may implement, and/or may be communicatively coupled to IoT device 105.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface. In some embodiments, base station 101 may be, may include, and/or may be implemented by one or more gNBs 711.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface. In some embodiments, base station 101 may be, may include, and/or may be implemented by one or more eNBs 713.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
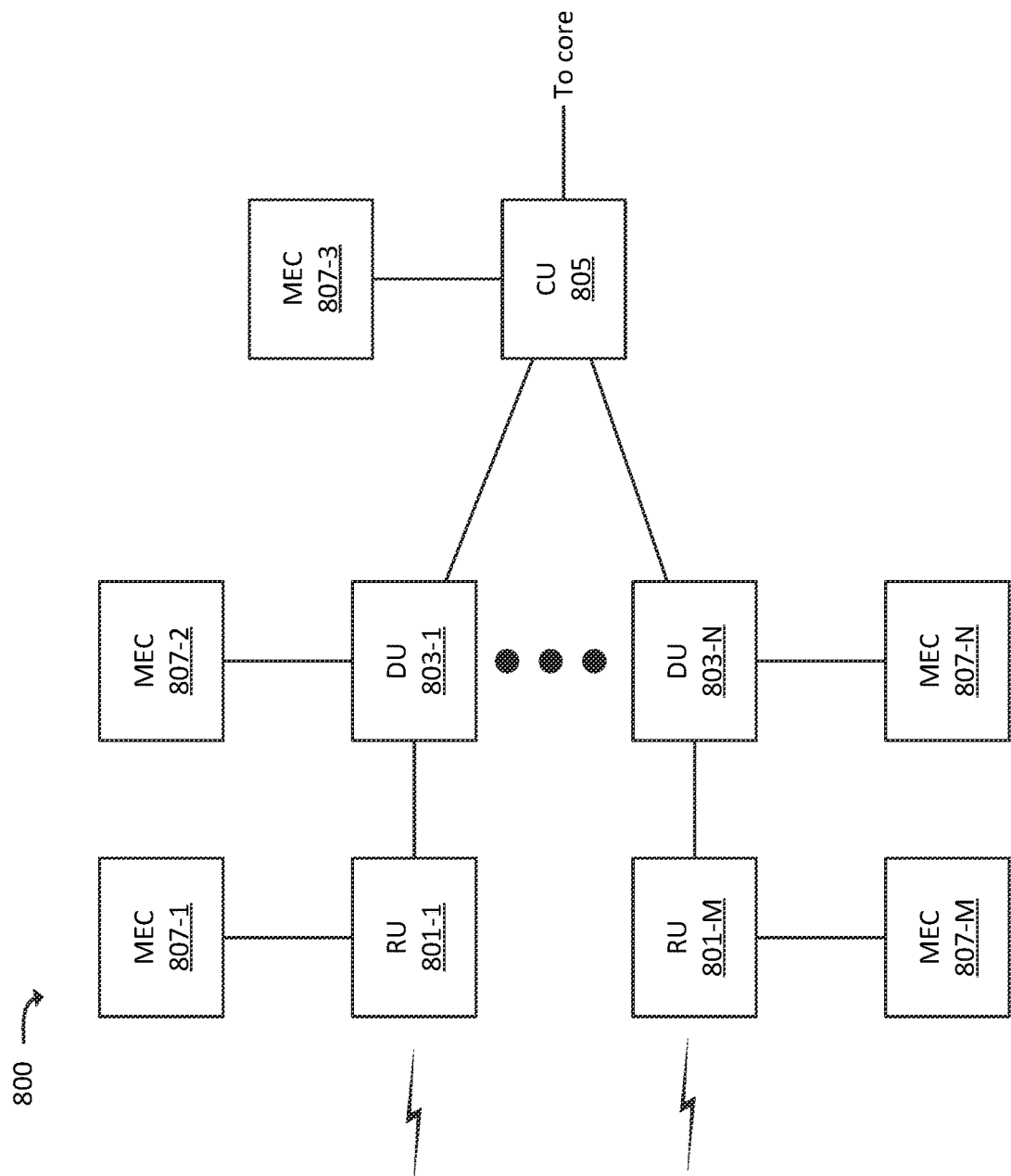
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network.

Figure 9:
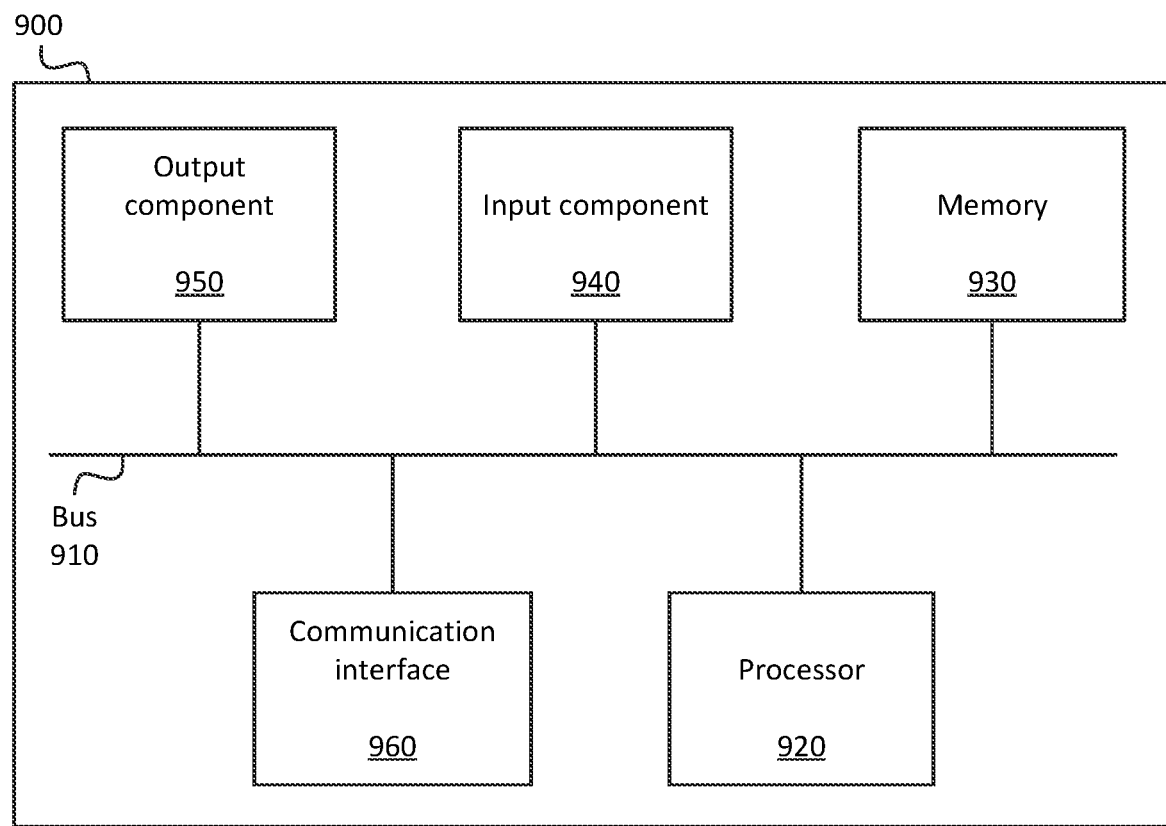
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4, 5A-5C, 6, and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
one or more processors configured to:
wirelessly output, prior to connecting to a base station of a radio access network ("RAN") via a first radio access technology ("RAT"), first presence information via a second RAT, wherein the first presence information includes a first Service Set Identifier ("SSID");
connect to the base station of the RAN via the first RAT;
wirelessly output, based on connecting to the base station via the first RAT, second presence information via the second RAT, wherein the second presence information includes a second SSID that is different from the first SSID;
connect to a second device via the second RAT;
receive resource information from the base station, the resource information including first timing information for communications from the first device to the base station via the first RAT;
determine second timing information associated with the second device based on the first timing information;
output an indication of the second timing information to the second device, wherein the second device utilizes the second timing information to output communications to the first device via the second RAT; and
output the communications received from the second device to the base station via the first RAT.

2. The first device of claim 1, wherein the first RAT includes a licensed RAT, and wherein the second RAT includes an unlicensed RAT.

3. The first device of claim 1, wherein the first timing information includes a first set of intervals, and wherein the second timing information includes a second set of intervals that is a subset of the first set of intervals.

4. The first device of claim 1, wherein the resource information, from the base station, indicates a set of Physical Resource Blocks ("PRBs") allotted by the base station for communications from the first device.

5. The first device of claim 1, wherein the second device includes an Internet of Things ("IoT") device.

6. The first device of claim 1, wherein determining the second timing information based on the first timing information includes synchronizing the second timing information with the first timing information.

7. The first device of claim 1, wherein the second SSID includes a particular predetermined value, wherein the first SSID does not include the particular predetermined value.

8. A non-transitory computer-readable medium, storing a plurality of processor-executable instructions to:
wirelessly output, prior to connecting to a base station of a radio access network ("RAN") via a first radio access technology ("RAT"), first presence information via a second RAT, wherein the first presence information includes a first Service Set Identifier ("SSID");
connect to the base station of the RAN via the first RAT;
wirelessly output, based on connecting to the base station via the first RAT, second presence information via the second RAT, wherein the second presence information includes a second SSID that is different from the first SSID;
connect to a device via the second RAT;
receive resource information from the base station, the resource information including first timing information for communications to the base station via the first RAT;
determine second timing information associated with the device based on the first timing information;
output an indication of the second timing information to the device, wherein the device utilizes the second timing information to output communications via the second RAT; and
output the communications received from the device to the base station via the first RAT.

9. The non-transitory computer-readable medium of claim 8, wherein the first RAT includes a licensed RAT, and wherein the second RAT includes an unlicensed RAT.

10. The non-transitory computer-readable medium of claim 8, wherein the first timing information includes a first set of intervals, and wherein the second timing information includes a second set of intervals that is a subset of the first set of intervals.

11. The non-transitory computer-readable medium of claim 8, wherein the resource information, from the base station, indicates a set of Physical Resource Blocks ("PRBs") allotted by the base station.

12. The non-transitory computer-readable medium of claim 8, wherein the device includes an Internet of Things ("IoT") device.

13. The non-transitory computer-readable medium device of claim 8, wherein determining the second timing information based on the first timing information includes synchronizing the second timing information with the first timing information.

14. The non-transitory computer-readable medium of claim 8, wherein the second SSID includes a particular predetermined value, wherein the first SSID does not include the particular predetermined value.

15. A method, comprising:
wirelessly outputting, by a first device and prior to connecting to a base station of a radio access network ("RAN") via a first radio access technology ("RAT"), first presence information via a second RAT, wherein the first presence information includes a first Service Set Identifier ("SSID");
connecting, by the first device, to the base station of the RAN via the first RAT;
wirelessly outputting, by the first device and based on connecting to the base station via the first RAT, second presence information via the second RAT, wherein the second presence information includes a second SSID that is different from the first SSID;

connecting, by the first device, to a second device via the second RAT;

receiving, by the first device, resource information from the base station, the resource information including first timing information for communications from the first device to the base station via the first RAT;

determining, by the first device, second timing information associated with the second device based on the first timing information;

outputting, by the first device, an indication of the second timing information to the second device, wherein the second device utilizes the second timing information to output communications to the first device via the second RAT; and outputting, by the first device, the communications received from the second device to the base station via the first RAT.

16. The method of claim 15, wherein the first timing information includes a first set of intervals, and wherein the second timing information includes a second set of intervals that is a subset of the first set of intervals.

17. The method of claim 15, wherein the resource information, from the base station, indicates a set of Physical Resource Blocks ("PRBs") allotted by the base station for communications from the first device.

18. The method of claim 15, wherein the second device includes an Internet of Things ("IoT") device.

19. The method of claim 15, wherein determining the second timing information based on the first timing information includes synchronizing the second timing information with the first timing information.

20. The method of claim 15, wherein the second SSID includes a particular predetermined value, wherein the first SSID does not include the particular predetermined value.

* * * * *